United States Patent
Srinivasan et al.

(10) Patent No.: US 10,825,266 B2
(45) Date of Patent: Nov. 3, 2020

(54) WIRELESS ECU CONFIGURATION UPDATING

(71) Applicant: Cummins Inc., Columbus, IN (US)

(72) Inventors: Prasanna Srinivasan, Columbus, IN (US); Michael F. Mattern, Columbus, IN (US); Gorance V. Eftimovski, Columbus, IN (US); Scott David Richter, Columbus, IN (US); Tomas Lopez Lauterio, Columbus, IN (US); Troy D. Hamilton, Columbus, IN (US); Ankit R Tarkas, Columbus, IN (US); Sagar R. Uplenchwar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 56 days.

(21) Appl. No.: 15/402,988

(22) Filed: Jan. 10, 2017

(65) Prior Publication Data
US 2018/0198846 A1   Jul. 12, 2018

(51) Int. Cl.
| | |
|---|---|
| G07C 5/00 | (2006.01) |
| H04L 29/06 | (2006.01) |
| H04L 9/32 | (2006.01) |
| H04L 29/08 | (2006.01) |
| F02D 41/26 | (2006.01) |
| H04W 12/00 | (2009.01) |
| H04W 4/44 | (2018.01) |
| H04W 12/06 | (2009.01) |
| F02D 41/28 | (2006.01) |
| H04W 12/02 | (2009.01) |

(52) U.S. Cl.
CPC .............. *G07C 5/008* (2013.01); *F02D 41/26* (2013.01); *H04L 9/3226* (2013.01); *H04L 9/3247* (2013.01); *H04L 63/0428* (2013.01); *H04L 63/083* (2013.01); *H04L 67/12* (2013.01); *H04L 67/34* (2013.01); *H04W 4/44* (2018.02); *H04W 12/0023* (2019.01); *F02D 41/28* (2013.01); *H04L 2209/84* (2013.01); *H04W 12/02* (2013.01); *H04W 12/06* (2013.01)

(58) Field of Classification Search
CPC ...................................................... H04L 67/10
See application file for complete search history.

(56) References Cited

U.S. PATENT DOCUMENTS

| | | | |
|---|---|---|---|
| 5,999,876 | A | 12/1999 | Irons et al. |
| 6,957,136 | B2 | 10/2005 | Tachibana et al. |
| 7,366,589 | B2 | 4/2008 | Habermas |
| 7,506,309 | B2 | 3/2009 | Schaefer |
| 8,290,659 | B2 | 10/2012 | Asano |
| 8,306,521 | B2 | 11/2012 | Ban |
| 8,397,228 | B2 | 3/2013 | Matlin et al. |
| 2005/0102669 | A1* | 5/2005 | Marney ................. H04L 1/0041 717/174 |
| 2005/0256614 | A1* | 11/2005 | Habermas ................. G06F 8/65 701/1 |

(Continued)

*Primary Examiner* — Nicholas P Celani

(74) *Attorney, Agent, or Firm* — Foley & Lardner LLP

(57) ABSTRACT

Systems, apparatuses, and methods disclosed provide for wirelessly updating engine control unit (ECU) configuration. The method includes determining parameters to be changed on an engine control unit of an equipment, generating a write package including the parameters to be changed, and transmitting the write package to the equipment over the air through a cloud connected application system.

22 Claims, 5 Drawing Sheets

(56) References Cited

U.S. PATENT DOCUMENTS

| | | | |
|---|---|---|---|
| 2007/0185624 A1 | 8/2007 | Duddles et al. | |
| 2009/0204308 A1* | 8/2009 | Manan | F02D 31/001 701/102 |
| 2015/0309784 A1 | 10/2015 | Molin et al. | |
| 2016/0196131 A1* | 7/2016 | Searle | H04L 41/082 717/173 |
| 2017/0039372 A1* | 2/2017 | Koval | G01D 4/004 |
| 2018/0017962 A1* | 1/2018 | Miller | G07C 5/008 |
| 2018/0152341 A1* | 5/2018 | Maeda | G06F 11/00 |

* cited by examiner

WIRELESS ECU CONFIGURATION UPDATING

TECHNICAL FIELD

The present disclosure relates to systems and methods for updating configuration of an engine control unit (ECU) over the air through a cloud connected application system.

BACKGROUND

The configuration of an engine control unit (ECU) is updated from time to time in order to improve fuel efficiency, adjust power, meet regulations, and so on. Traditionally, a vehicle carrying the ECU is physically brought to a service center, where service personnel connects the ECU to an authorized electronic service tool to update the configuration. Alternatively, in the case of stationary equipment for example, service personnel travels to the equipment to connect the electronic service tool to update the configuration. The vehicle downtime increases because the update is not done until the vehicle is at the hand of an authorized person having the tool. Moreover, if the vehicle is in mission, it is unfeasible for the driver or operator who does not have the authorized tool and/or the knowledge to make changes necessary for the mission. A more efficient and convenient way for updating the ECU configuration is desired.

SUMMARY

One embodiment relates to an apparatus comprising a communication interface structured to transmit and receive data through a cloud connected application system, and a controller communicably coupled to the communication interface. The controller is structured to determine parameters to be changed on an engine control unit of an equipment, generate a write package including the parameters to be changed, and cause the communication interface to transmit the write package to the equipment through the cloud connected application system.

Another embodiment relates to a method performed by a computing system. The method comprises determining parameters to be changed on an engine control unit of an equipment, generating a write package including the parameters to be changed, and transmitting the write package to the equipment over the air through a cloud connected application system.

Yet another embodiment relates to an engine control unit comprising a first memory, a second memory, and a controller communicably connected to the first memory and the second memory. The controller is structured to buffer a write package in a second memory. The write package is received through a cloud connected application system and includes parameters to be changed on the engine control unit. The controller is further structured to determine that a key switch for an engine connected to the engine control unit is turned off, commit the parameters to be changed to the first memory in response to determining that the key switch is turned off, and operate the engine using the parameters committed in the first memory in response to the key switch being turned on.

Still another embodiment relates to a method comprising buffering a write package in a second memory. The write package is received through a cloud connected application system and includes a list of parameters to be changed on an engine control unit. The method also comprises determining that a key switch for an engine connected to the engine control unit is turned off, committing the parameters to be changed to a first memory in response to determining that the key switch is turned off, and operating the engine connected to the engine control unit using the parameters committed in the first memory in response to the key switch being turned on.

These and other features, together with the organization and manner of operation thereof, will become apparent from the following detailed description when taken in conjunction with the accompanying drawings.

DETAILED DESCRIPTION

Figure 1:
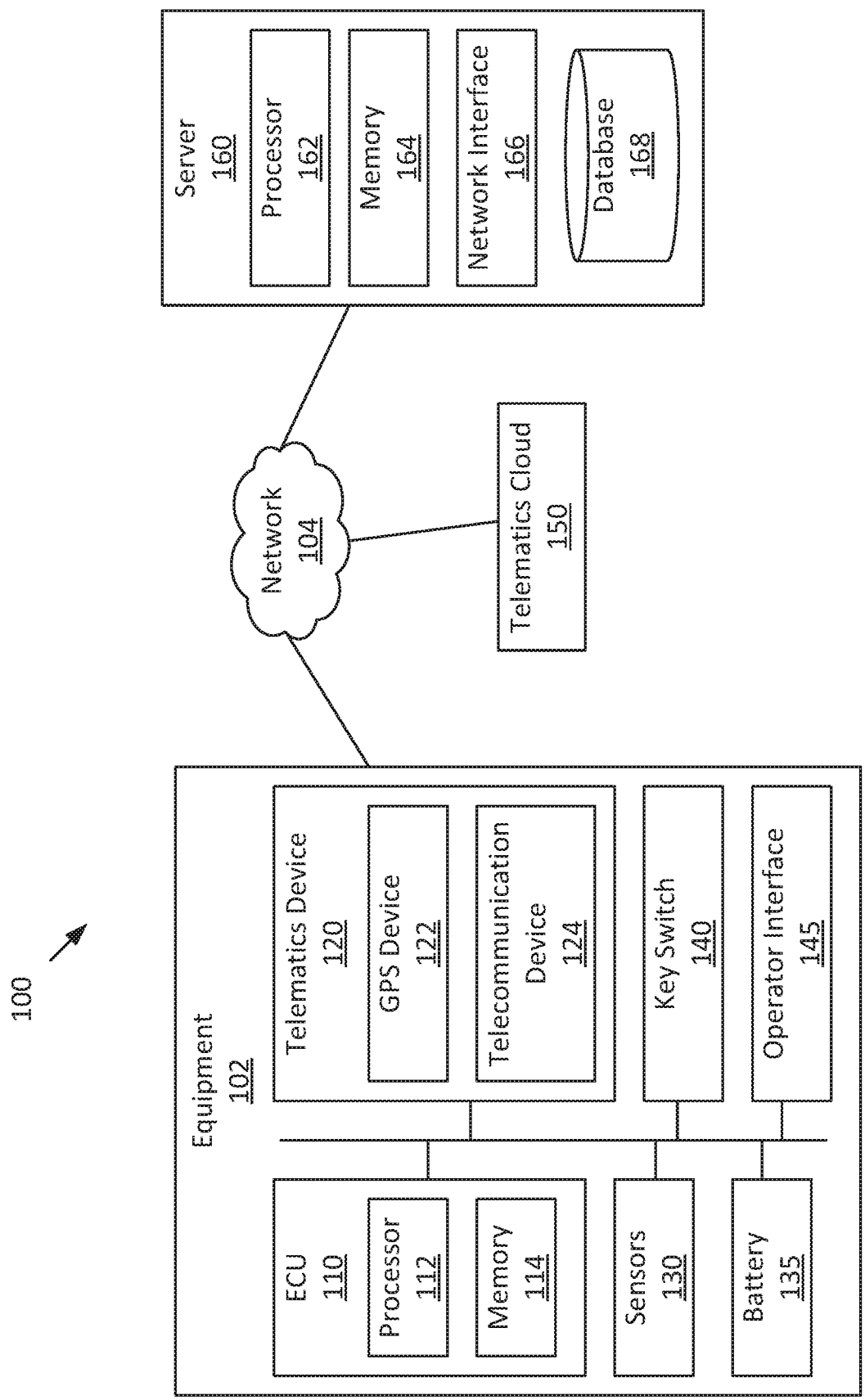
FIG. 1 is a block diagram of a computing environment for updating the configuration of an engine control unit (ECU) over the air according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods for updating the configuration of an engine control unit (ECU) over the air. As used herein, "over the air" refers to the wireless delivery of updated configuration to the ECU. In particular, a fleet manager or any other authorized user logs into a web portal operated by a manufacturer or a third party. The authorized user views the current configuration of an ECU on a vehicle or a stationary equipment and changes the value(s) of adjustable parameter(s) of the ECU to improve fuel efficiency, adjust power, meet regulations, or adapt to the mission of the vehicle from the web portal. A server running the web portal checks whether the changes should be applicable to the vehicle. Incorrect and/or out-of-bounds parameter values are not accepted. The server then generates a write package that includes the parameters to be changed for the ECU and sends the write package to the vehicle carrying the ECU through a telematics cloud in a secured manner. An onboard telematics device (e.g., telematics box) receives the write package, which is buffered into a RAM memory of the ECU without interruption when the vehicle is in mission. When the key switch is turned off for the vehicle, the ECU validates the write package stored in the RAM buffer and commits the parameters to be changed to a main flash memory of the ECU. When the key switch is turned on again, the vehicle is operated based on the changed values of the parameters. The systems and methods disclosed herein can use industry standard modes of communication to change ECU parameters through an approved and compatible telematics environment. Updating the ECU configuration over the air can improves the efficiency and convenience of the process.

Referring now to FIG. 1, a block diagram of a computing environment 100 for recommending service site(s) for a vehicle is shown according to an example embodiment. The computing environment 100 includes an equipment 102, a telematics cloud 150, and a server 160 communicating with each other via a network 104.

The equipment 102 may be a stationary equipment (e.g., a power generator) or a vehicle. The vehicle may be on-road vehicles (e.g., trucks, buses), off-road vehicles (e.g., four-wheelers and ATVs, tractors, lawn mowers, snowmobiles), marine vessels (e.g., ships, submarines, boats, yachts, cruise ships), construction equipment (e.g., concrete trucks, hand-operated tools, loaders, boom lifts), mining equipment (e.g., mobile mining crushers, dozers, loaders), oil and gas equipment (e.g., drilling apparatuses, dozers, loaders, rigs), or any other type of vehicles. The equipment 102 may generally include a fuel tank, engine, powertrain system, and wheels (not shown in the present figure). The equipment 102 is shown to include an engine control unit (ECU) 110, a telematics device 120, sensors 130, a battery 135, a key switch 140, and an operator interface 145. Components of the equipment 102 may communicate with each other via any number of wired or wireless connections. For example, a wired connection may include a serial cable, a fiber optic cable, a CAT5 cable, or any other form of wired connection. In comparison, a wireless connection may include the Bluetooth, Wi-Fi, cellular, radio, etc. In one embodiment, components of the equipment 102 are connected to a vehicle network such as a control area network (CAN) or a manufacturer proprietary network.

The ECU 110 includes a processor 112 and a memory 114. The memory 114 stores various instructions (and parameters) that, when executed by the processor 112, control the operation of the engine of the equipment 102. The processor 112 may be implemented as a general-purpose processor, an application specific integrated circuit (ASIC), one or more field programmable gate arrays (FPGAs), a digital signal processor (DSP), a group of processing components, or other suitable electronic processing components. The memory 114 may include one or more tangible, non-transient volatile memory or non-volatile memory, e.g., NVRAM, RAM, ROM, Flash Memory, hard disk storage, etc.). Moreover, the memory 114 may include database components, object code components, script components, or any other type of information structure.

In operation, the ECU 110 receives data from sensors 130 positioned throughout the equipment 102, retrieves performance parameters and/or performance limits for the engine stored in the memory 114, and outputs signals controlling various components of the engine based on the sensor data and the parameter configuration. The sensors 130 monitor the operational status and condition of the engine, such as engine speed, engine temperature, engine load, aftertreatment exhaust gas composition, etc. The ECU parameters stored in the memory 114 may include engine brake parameters, gear down protection parameters, idle control parameters, power take off parameters, and the like. The ECU 110 may control, for example, the amount of air and/or fuel sent to the engine cylinder(s) per engine cycle, ignition timing, variable valve timing, and operation of other engine components based on the sensor data and the set ECU parameters. A user may wish to change the ECU parameters, from time to time, in order to improve fuel efficiency, adjust power, meet regulations, or adapt to the mission of the equipment 102.

The telematics device 120 installed on the equipment 102 is structured to receive updated parameters for the ECU 110 from the telematics cloud 150 and transmit information relating to the equipment 102 obtained onboard to the telematics cloud 150 via the network 104. In some embodiments, the telematics device 120 is an OEM device embedded in the equipment 102. In other embodiments, the telematics device 120 is an aftermarket standalone device, e.g., a telematics box coupled to the equipment 102 through, for example, a diagnostic port of the onboard diagnostic system (OBD) (not shown in the present Figure). The telematics device 120 may access the ECU 110 to read and write data. In some embodiments, the telematics device 120 may integrate certain telecommunication functions. For example, a navigation system within the equipment 102 may be included in the telematics device 120.

The telematics device 120 includes a GPS device 122 and a telecommunication device 124. The GPS device 122 tracks the location of the equipment 102 (e.g., latitude and longitude data, elevation data, etc.). The telecommunication device 124 communicates with the telematics cloud 150 over the network 104. Although not shown in FIG. 1, the telecommunication device 124 may include an antenna, a radio frequency (RF) transceiver, and a subscriber identity module (SIM). The telecommunication device 124 may follow any type of mobile communications protocol, for example but not limited to, cellular, satellite, radio, Wi-Fi, WiMax, Bluetooth, Zigbee, GSM, GPRS, LTE, and the like.

The battery 135 can maintain the power for the ECU 110 after the key switch 140 is turned off so that the processor 112 can function and data stored in the memory 114 is not lost. When the vehicle key switch 140 is turned off, the ECU 110 shuts down the engine. Non-volatile memory components of the memory 114 (e.g., RAM, flash memory) may need some power to maintain the state, which may include small amount of electrical power derived from the battery 135. The battery 135 may include any type of rechargeable battery and of any suitable size. That is to say, the battery 135 may be implemented as any type of electrical energy storing and providing device, such as one or more capacitors (e.g., ultra capacitors), Lithium-ion batteries, Nickle-Metal Hydride batteries, Lead-acid batteries, etc.

The operator interface 145 enables an operator of the equipment 102 to read status and conditions of the equipment 102 and confirm updating parameters for the ECU 110. For example, the operator interface 145 may include, but is not limited to, an interactive display (e.g., a touchscreen, etc.), a dashboard, a control panel, etc. For example, the check engine light on the dashboard may be turned on when a fault of the engine occurs. The tire air pressure light may be turned on when the tire air pressure is outside of the normal operational range. When updated engine parameters are ready to be deployed, the operator interface 145 may display a notification asking the operator of the equipment 102 to approve the use of updated parameters. After the operator's approval, the telematics device 120 will send the updated parameters to the ECU 110. Alternatively or additionally, the operator interface 145 may display a notification informing the operator of the equipment 102 that parameters have been updated in the ECU 110.

The telematics cloud 150 may be a cloud connected application system that communicates with the telematics device 120 onboard via the network 104. The telematics cloud 150 may include one or more servers, computers, processing systems, and the like, operated by a telematics service provider and/or a third party. In some embodiments, the telematics cloud 150 relays communication between the telematics device 120 and the server 160. For example, the telematics cloud 150 relays the vehicle related information obtained onboard from the telematics device 120 to the server 160, and the updated configuration for the ECU 110 from the server 160 to the telematics device 120.

The server 160 may communicate with the telematics cloud 150 via the network 104, receiving the vehicle related information and transmitting updated parameters for the ECU 110. In some embodiments, the server 160 may further analyze the vehicle related information and/or determine the updated configuration for the ECU 110. In some embodiments, the server 160 is implemented as a central computing system hosted by a component manufacturer, a vehicle manufacturer, an OEM, or multiple parties. In some embodiments, the telematics server 160 is implemented as a cloud network including multiple computing systems, which can share and transfer vehicle information and data store, and coordinate to process the received data.

The server 160 includes a processor 162, a memory 164, a network interface 166, and a database 168. The memory 164 stores various instructions that, when executed by the processor 162, control the operation of the server 160. The network interface 166 allows the server 160 to send and receive data to and from external devices via the network 104. The network interface 166 may be a wireless network interface that communicates with a wireless communication protocol (e.g., 802.11a/b/g/n, Bluetooth®, ZigBee®, CDMA, GSM, LTE, WiMax, etc.) or a wired communication protocol (e.g., Ethernet, USB, Thunderbolt®, etc.). The database 168 is structured to receive and store, hold, and otherwise serve as a repository for vehicle information, fleet information, and other information (e.g., warranty information). In some embodiments, the database 168 may be a separate component relative to the telematics server 160. For example, due to the potential high volume or quantity of data stored by the database 168, the database 168 may be formed or constructed from two or more server-based storage components stored over two or more remote geographic locations. In further embodiments, the database 168 may also include one or more classification and/or categorization functions (e.g., logic processing, etc.). The classification function may sort, categorize, or otherwise classify each piece of information according to various parameters.

The network 104 may include private networks, public networks, or a combination thereof. In some embodiments, the network 104 includes the Internet. The network 104 may be a combination of wireless and wired networks. The wireless network may be any type of wireless network, for example, a satellite or cellular network using protocols such as Global System for Mobile Communications (GSM), Code Division Multiple Access (CDMA), General Packet Radio Service (GPRS), Long Term Evolution (LTE), High Rate Packet Data (HRPD), Wi-Fi, Personal Communications Service (PCS), etc. The wired network may be any type of wired network, for example, Ethernet network, Local Talk, Fiber Distributed Data Interface (FDDI), etc.

Figure 2:
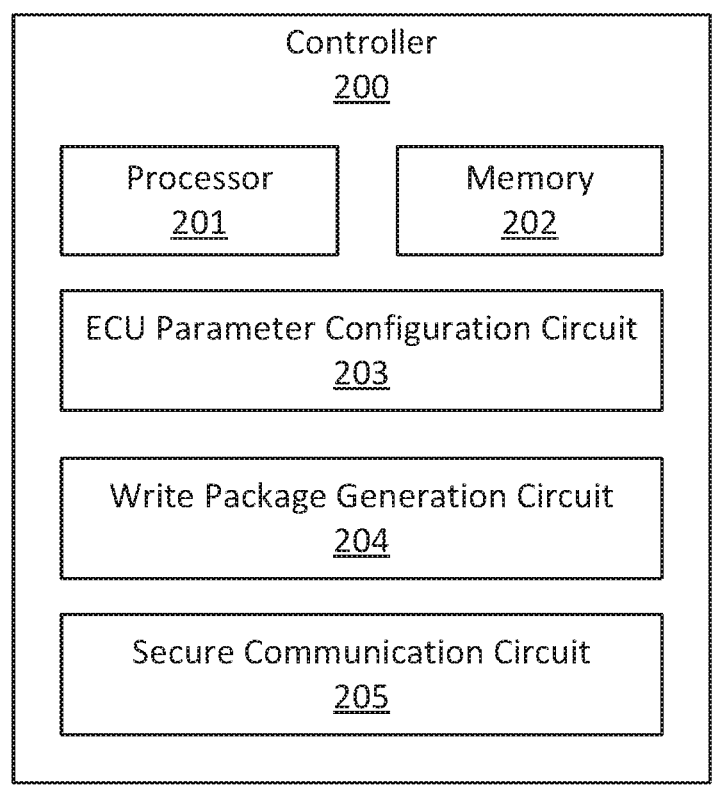
FIG. 2 is a block diagram of a controller on a server side for updating the ECU configuration over the air, according to an example embodiment.

Referring now to FIG. 2, a schematic diagram of a controller 200 on a server side for updating the ECU configuration over the air is shown according to an example embodiment. The controller 200 can be implemented on the server 160. The controller 200 includes a processor 201, a memory 202, and various circuits 203 through 205. The processor 201 may be implemented as any type of processor including an application specific integrated circuit (ASIC), one or more field programmable gate arrays (FPGAs), a digital signal processor (DSP), a group of processing components, or other suitable electronic processing components. The memory 202 may include one or more tangible, non-transient volatile memory or non-volatile memory, e.g., NVRAM, RAM, ROM, Flash Memory, hard disk storage, etc.). Moreover, the memory 202 may include database components, object code components, script components, or any other type of information structure.

The controller 200 includes various circuits 203 through 205 for completing the activities described herein. In one embodiment, the circuits of the controller 200 may utilize the processor 201 and/or memory 202 to accomplish, perform, or otherwise implement various actions described herein with respect to each particular circuit. In this embodiment, the processor 201 and/or memory 202 may be considered to be shared components across each circuit. In another embodiment, the circuits (or at least one of the circuits) may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory 202, or combined in multiple circuits, or as a single circuit. In this regard and while various circuits with particular functionality are shown in FIG. 2, it should be understood that the controller 200 may include any number of circuits for completing the functions and activities described herein. For example, the activities of multiple circuits may be combined as a single circuit, as an additional circuit(s) with additional functionality, etc. Further, it should be understood that the controller 200 may further control other activity beyond the scope of the present disclosure.

Certain operations of the controller 200 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The controller 200 includes an ECU parameter configuration circuit 203, a write package generation circuit 204, and a secure communication circuit 205. Through the circuits 203-205, the controller 200 is structured to determine parameters to be changed on the ECU 110 carried by the equipment 102, generate a write package including the parameters to be changed, and cause the network interface 166 to transmit the write package to the equipment 102 through the telematics cloud 150.

The ECU parameter configuration circuit 203 is structured to determine parameters to be changed on the ECU 110. As discussed above, the ECU 110 controls the operation of various components of the engine based on the configuration parameters stored in the memory 114. The parameters can be defined as adjustable, which can be changed by a user, or non-adjustable, which cannot be changed by a user. The adjustable parameters may include various vehicle setup parameters, engine brake parameters, engine protection parameters, gear down protection parameters, idle speed control parameters, load based speed control parameters, power take off parameters, road speed governor parameters, cruise control parameters, and so on.

The vehicle setup parameters include, for example, a vehicle setup application type parameter which specifies the vehicle's appropriate application type. This parameter can be either "On Highway" or "On/Off highway." The On Highway choice can be made if the vehicle is used primarily in long haul/highway situations. This parameter helps the ECU understand how the vehicle is used.

The engine brake parameters include, for example, an engine brake minimum vehicle speed parameter, which allows activation of the engine compression brake only when the vehicle is traveling faster than an adjustable minimum speed. Thus, engine brake operation can be prevented in urban areas where noise could be a problem by setting the engine brake minimum vehicle speed parameter. This parameter can be chosen within a range of, for example, 0 miles/hour (MPH) to 35 MPH.

The engine protection parameter includes, for example, an engine protection shutdown parameter, which can be "enabled" or "disabled." If the parameter is enabled, the ECU can initiate an engine shutdown when certain operating limits (e.g., engine oil temperature limit, engine coolant level) have been exceeded and continued operation may cause damage to the engine. In some embodiments, this parameter is enabled if the security of automatic engine protection shutdown is desired.

The gear down protection parameters include, for example, a gear down protection heavy load vehicle speed parameter and a gear down protection light load vehicle speed parameter. The heavy load vehicle speed specifies the maximum vehicle speed while the transmission is one gear down from top gear and operating under heavy load conditions. The light load vehicle speed specifies the maximum vehicle speed while the transmission is one gear down from top gear and operating under light load conditions. In some embodiments, the user sets the parameters in a range between for example, 30 MPH and 120 MPH. In some embodiments, the user may choose to have the ECU calculated the parameters.

The idle speed control parameters include, for example, an idle engine speed parameter, an idle shutdown parameter, and an idle shutdown timer. The idle engine speed parameter specifies the desired idle speed and may be chosen within a range of, for example, 500 RPM to 800 RPM. The idle shutdown parameter may be "enabled" or "disabled." If this parameter is enabled, the engine will automatically shut down after running at idle for a specified amount of time. The idle shutdown timer specifies the maximum idle time allowed before the engine shutdown occurs.

The load based speed control parameters include, for example, a high engine speed breakpoint which specifies the maximum engine speed during normal operating conditions when operating in the lower transmission gears and with a high power demand, and a low engine speed breakpoint which specify the maximum engine speed during normal operating conditions when operating in the lower transmission gears and with a low power demand.

The power take off parameters include, for example, a power take off (PTO) parameter which may be "enabled" or "disabled." If this parameter is enabled, accurate power take off speed control will be enforced. In further embodiments, a PTO maximum vehicle speed parameter specifies the vehicle speed above which PTO cannot be activated. If PTO is active and the vehicle speed exceeds this value, PTO will be automatically deactivated. This parameter can be chosen within a range of, for example, 0 MPH to 15 MPH. A PTO maximum engine speed is used to limit maximum engine speed while using PTO. A PTO minimum engine speed is used to limit engine speed while using PTO. The PTO minimum engine speed must be set at a value lower than that of the PTO maximum engine speed.

The road speed governor parameters include, for example, a global maximum vehicle speed which specifies the maximum speed the vehicle may attain. In further embodiments, an accelerator maximum vehicle speed specifies the maximum speed the vehicle can operate while using the foot accelerator on level road. This parameter may be chosen within a range of, for example, 30 MPH to 120 MPH. An accelerator lower droop specifies the increase in speed above the set vehicle speed that the vehicle may travel in downhill circumstances. This parameter may be chosen within a range of, for example, 0 MPH to 3 MPH. Setting it to 3 MPH will allow the vehicle to exceed the set vehicle speed by 3 MPH before limiting fueling. An accelerator upper droop specifies the reduction in the set vehicle speed in uphill circumstances. This parameter may be chosen within a range of, for example, 0 MPH to 3 MPH. Setting the upper droop to 3 MPH can provide best fuel economy benefit.

The cruise control parameters include, for example, a cruise control enable parameter which enables the cruise control feature if chosen. In further embodiments, a cruise control maximum vehicle speed parameter specifies the maximum vehicle speed when the cruise control feature is active. This parameter may be chosen within a range of, for example, 30 MPH to 100 MPH. A cruise control auto resume parameter which, when enabled, allows the cruise control to automatically resume the set speed after the operator of the vehicle makes a clutched gear change.

It should be understood that the parameters discussed herein are for illustration not for limitation. There can be more, fewer, or different adjustable parameters for configuring an ECU.

In some embodiments, the parameters are changed by an authorized user, e.g., a fleet manager. The authorized user logs into a web portal operated by or otherwise connected to the server 160 and views the current configuration of the ECU. When the user decides that one or more changes need to be made to improve fuel efficiency, adjust power, meet regulations, or adapt to the mission of the vehicle, the user can update the adjustable parameters for the ECU from the web portal, which can be received by the ECU parameter configuration circuit 203. For example, the user can switch the vehicle setup application type parameter from "On Highway" to "On/Off highway" when the vehicle used to be but is no longer involved in long haul/highway missions. In some embodiments, the ECU parameter configuration circuit 203 can determine to change one or more parameters based on the operation condition of the vehicle. For example, the controller 200 may run an analytical process which may determine optimum parameter settings for fuel efficiency, etc., and command a parameter change. Alternatively or additionally, the controller 200 may compare the current parameter settings to a predetermined set of parameter values and command a parameter change.

In some embodiments, the ECU parameter configuration circuit 203 is further structured to check whether the parameters to be changed can be applicable to the vehicle. This ensures that incorrect and/or out-of-bounds parameter values will not be written to the ECU 110 to cause unintended behavior. For example, as discussed above, the engine brake minimum vehicle speed parameter can be chosen within a range of 0 MPH to 35 MPH. If the user sets the parameter as 45 MPH, the ECU parameter configuration circuit 203 will not accept the configuration and inform the user (e.g., display a notification on the web portal) that the set engine brake minimum vehicle speed is out of bounds. In another example, the idle shutdown timer can be enforced only when the idle shutdown parameter is enabled. If the user sets the idle shutdown timer with the idle shutdown parameter being disabled, the ECU parameter configuration circuit 203 will not accept the idle shutdown timer. In yet another example, the PTO minimum engine speed should be set at a value lower than that of the PTO maximum engine speed. The ECU parameter configuration 203 would not accept a configuration in which the PTO minimum engine speed is set higher than the PTO maximum engine speed by the user.

The write package generation circuit 204 is structured to generate a "write package" including the parameters to be updated, once the changes are accepted by the ECU parameter configuration circuit 203. In some embodiments, the write package includes a count of the parameters to be changed and a list of the parameters to be changed. For example, the authorized user updated the global maximum vehicle speed parameter, the accelerator maximum vehicle speed parameter, the accelerator lower droop parameter, and the accelerator upper droop parameter. The write package includes a list of the four parameters with updated values as well as a count of "four." The ECU 110 will check whether the count in the write package matches with the number of parameters in the list when receiving the write package. In addition, the contents of the write package may be encrypted. Thus, the corruption, tampering, or mishandling of data can be prevented. In some embodiments, the write package includes an authentication password for accessing the ECU 110. For example, the fleet manager or the OEM could have set a password to lock parameters of the ECU 110 from being modified by unauthorized person. The ECU 110 will check whether the authentication password in the write package matches with the preset password saved in the memory 114 when receiving the write package. Finally, the entire write package may be digitally signed. These measures can protect against changes by unauthorized users, as well as corruption, tampering, or relay attack by any rogue device in the network 104 or in the on-vehicle network.

The secure communication circuit 205 is structured to cause the network interface 166 to transmit the write package to the equipment 102 through the telematics cloud 150. The transmission can use an over the air transfer method compatible with a software development kit (SDK). The SDK includes application programming interfaces (e.g., REST APIs) and datalink protocols to enable a communication channel between the server 160, the telematics cloud 150, and the telematics device 120. The SDK can be provided to a telematics provider who is willing to implement the framework to achieve the functions described herein. The telematics provider may be asked to sign a data sharing agreement document prior to being given the SDK. In some embodiments, the write package is transmitted through a secured communication channel. For example, the onboard telematics device 120 sends a seed obtained from the ECU 110 to the server 160 (e.g., using REST APIs on the telematics cloud 150). The server 160, in response to receiving the seed, sends a unique access key to the telematics device 120 through the telematics cloud 150. The telematics device 120 then uses the unique access key to establish a secure encrypted session. Advantageously, the secured communication channel reduces security vulnerabilities by facilitating the secure transfer of data to the ECU 110. Some example embodiments for requesting a seed and establishing a secure communication channel are described in the PCT Application No. PCT/US16/53755 filed Sep. 26, 2016, and entitled "System, Method, and Apparatus for Secure Telematics Communication," which is incorporated herein by reference in its entirety.

Figure 3:
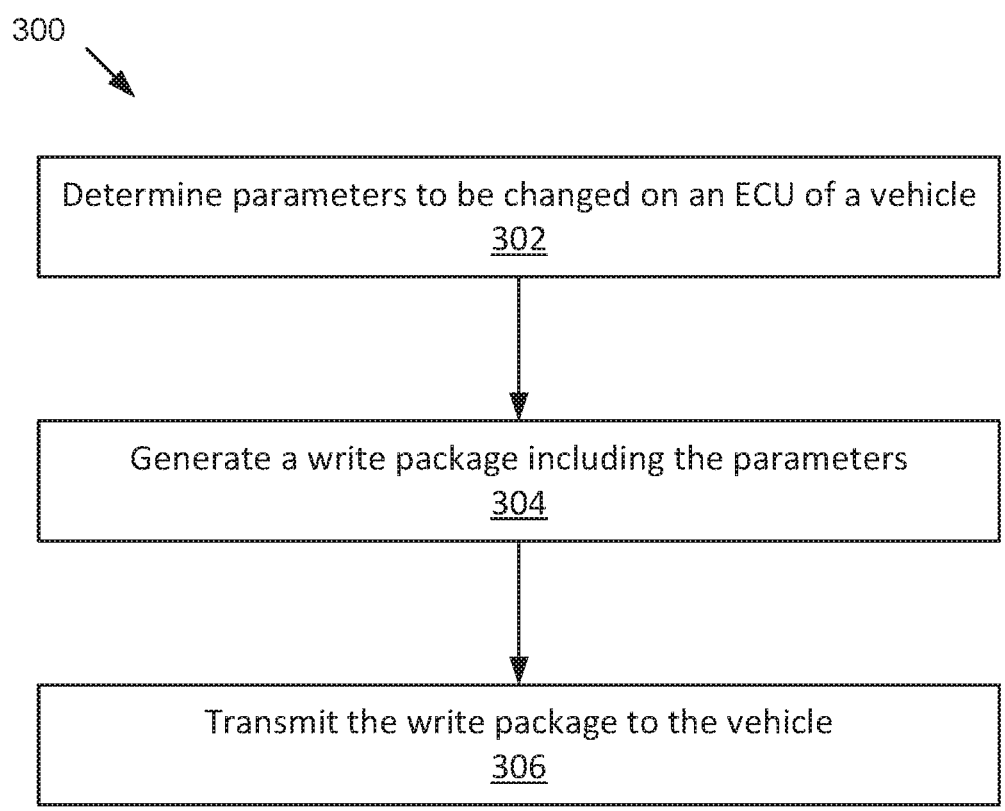
FIG. 3 is a flow diagram of a method performed on a server side for updating the ECU configuration over the air, according to an example embodiment.

Referring now to FIG. 3, a flow diagram of a method 300 for updating the ECU configuration over the air on a server side is shown according to an example embodiment. The method 300 may be executed by the server 160.

At a process 302, parameters to be changed on an ECU of an equipment (e.g., vehicle or stationary equipment) are determined. The parameters may include various adjustable parameters, such as vehicle setup parameters, engine brake parameters, engine protection parameters, gear down protection parameters, idle speed control parameters, load based speed control parameters, power take off parameters, road speed governor parameters, cruise control parameters, and so on. In some embodiments, the parameters are changed by an authorized user (e.g., a fleet manager) from a user interface (e.g., a web portal). In some embodiments, the parameters to be changed are determined automatically based on the operation condition of the vehicle. For example, the ECU may run an analytical process which may determine optimum parameter settings for fuel efficiency, etc., and command a parameter change. Alternatively or additionally, the ECU may compare the current parameter settings to a predetermined set of parameter values and command a parameter change. In some embodiments, it is checked whether the parameters to be changed can be applicable to the vehicle. This ensures that incorrect and/or out-of-bounds parameter values will not be written to the ECU to cause unintended behavior.

At a process 304, a write package including the parameters to be changed is generated. In some embodiments, the write package includes a count of the parameters to be changed and a list of the parameters to be changed. The ECU can check whether the count in the write package matches with the number of parameters in the list when receiving the write package. In some embodiments, the write package includes an authentication password for accessing the engine control unit of the vehicle. The ECU can check whether the authentication password in the write package matches with the preset password saved in the memory when receiving the write package. The write package may be digitally signed. These measures can protect against changes by unauthorized users, as well as corruption, tampering, or relay attack by any rogue device in the network 104 or in the on-vehicle network.

At a process 306, the write package is transmitted to the vehicle through a cloud connected application system (e.g., the telematics cloud 150). The transmission can use an over the air transfer method compatible with a SDK. The SDK includes application programming interfaces (e.g., REST APIs) and datalink protocols to enable a communication channel between the server, the telematics cloud, and an onboard telematics device in the vehicle. In some embodiments, the write package is transmitted through a secured communication channel. For example, the onboard telematics device sends a seed obtained from the ECU to the server (e.g., using REST APIs on the telematics cloud). The server in response to receiving the seed, sends a unique access key to the telematics device through the telematics cloud. The telematics device then uses the unique access key to establish a secure encrypted session.

Figure 4:
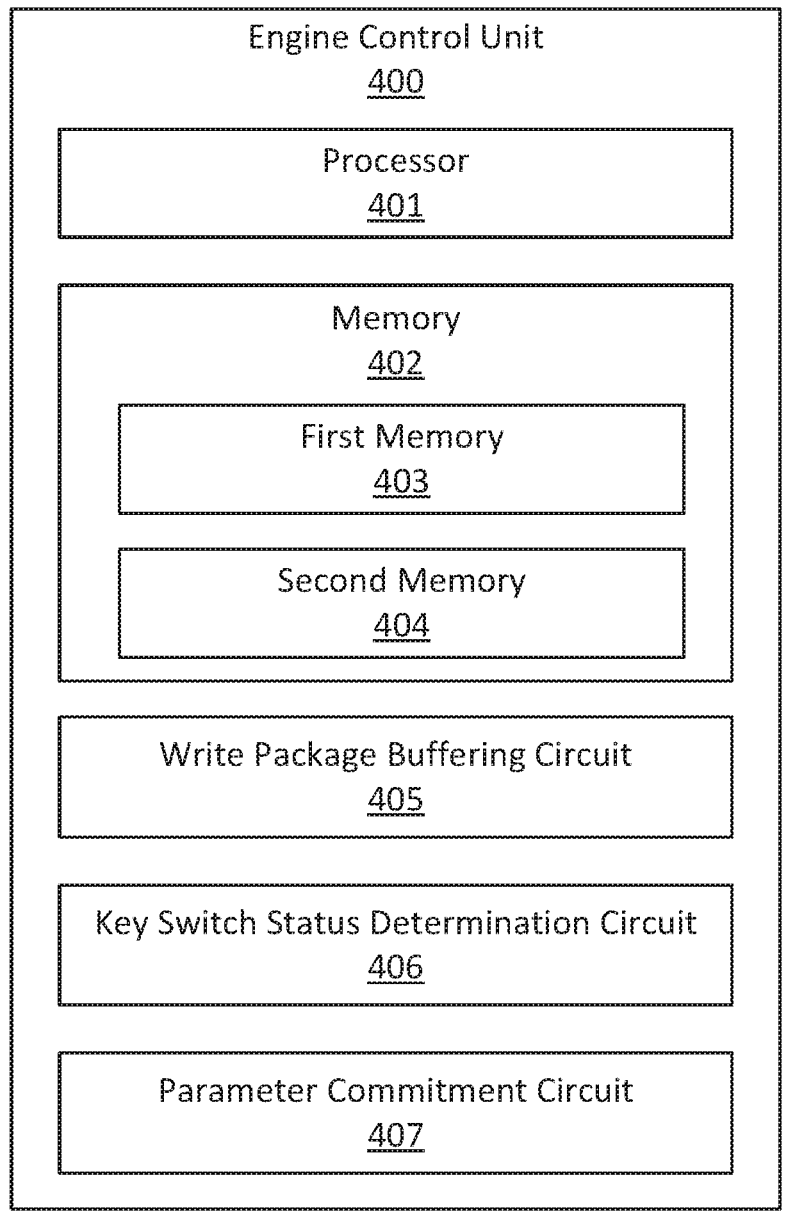
FIG. 4 is a block diagram of an ECU for which configuration is to be updated according to an example embodiment.

Referring to FIG. 4, a block diagram of an ECU 400 for which configuration is to be updated according to an example embodiment. The ECU 400 can correspond to the ECU 110 in FIG. 1. The ECU 400 includes a processor 401, a memory 402 including a first memory 403 and a second memory 404, a write package buffering circuit 405, a key switch status determination circuit 406, and a parameter commitment circuit 407. Through the circuits 405-407, the ECU 400 is structured to buffer a write package (including ECU parameters to be updated) received through a cloud connected application system in the second memory 404, determine that a key switch for an engine connected to the ECU 400 is turned off, commit the parameters to the first memory in response to determining that the key switch being turned off, and operate the engine using the parameters committed in the first memory in response to the key switch being turn on again. In some embodiments, the first memory 403 and the second memory 404 are implemented as separate physical chips. On other embodiments, the first memory 403 and the second memory 404 are implemented on separate areas of the same physical memory chip.

As discussed above, the memory 402 of the ECU 400 may include one or more tangible, non-transient volatile memory or non-volatile memory, e.g., NVRAM, RAM, ROM, Flash Memory, hard disk storage, etc.). In some embodiments, the first memory 403 takes the form of a flash memory, while the second memory 404 takes the form of a RAM. As discussed below, the received write package for updating ECU parameters is buffered in the second memory 404 during an active engine state (e.g., when the engine is on) and committed into the first memory 403 when the engine is off. Advantageously, operation of the vehicle is not interrupted by the write package because the current ECU parameters, sensor data, programmatic code, and/or applications continue to execute via the first memory 403 (e.g., the main memory).

The write package buffering circuit 405 is structured to buffer the write package received through the telematics cloud 150 into the second memory 404. The write package may be received through a secured communication channel. In some embodiments, the write package includes a count of the parameters to be changed and a list of the parameters to be changed. The write package buffering circuit 405 compares the count with the number of parameters in the list. If the count and the number do not match, the write package buffering circuit 405 discards the write package. Thus, the corruption, tampering, or mishandling of data can be prevented. In some embodiments, the write package includes an authentication password for accessing the ECU 400. For example, the fleet manager or the OEM could have set a password to lock parameters of the ECU 400 from being modified by unauthorized person. The password may be stored in the memory 402. The write package buffering circuit 405 compares the authentication password in the write package with the password stored in the memory 402. If the two passwords do not match, the write package buffering circuit 405 discards the write package. In some embodiments, the write package buffering circuit 405 is structured to set a flag in response to buffering the write package in the second memory 404 to indicate that updated parameters are ready to be committed. The flag is useful because the commitment takes place after the engine is turned off, which may be hours after the write package is buffered in the second memory 404.

The key switch status determination circuit 406 is structured to determine that the key switch 140 is turned off or turned on. When the key switch 130 is turned off/on, a message indicative of the key switch off event is generated by, for example, a sensor, and transmitted to the key switch status determination circuit 406, which then determines that the key switch is turn off/on.

The parameter commitment circuit 407 is structured to commit the parameters to be changed to the first memory 403 in response to determining that the key switch 140 is turned off. Since the engine is off, the ECU 400 derives a small amount of electrical power from the battery 135 to perform the commitment and maintain the state of the non-volatile memory 403 and 404. In some embodiments, the parameter commitment circuit 407 compares the count in the write package with the number of parameters in the list, like what the write package buffering circuit 405 has done. If the count and the number do not match, the parameter commitment circuit 407 does not commit the parameters in the first memory 403 but rather discards the write package. In some embodiments in which a flag was set when the write package is buffered in the second memory 404, the parameter commitment circuit 407 clears the flag in response to committing the parameters in the first memory 403.

When the engine is turned on (e.g., the key switch 140 is turned on), the ECU 400 controls the operation of the engine according to the updated parameters stored in the first memory 403. In some embodiments, when updated engine parameters are ready to be deployed, the operator interface 145 may display a notification asking the operator of the equipment 102 to approve the use of updated parameters. After the operator's approval, the ECU 400 will enforce the updated parameters. Alternatively or additionally, the operator interface 145 may display a notification informing the operator that parameters have been updated in the ECU 400. When the key switch 130 is turned on, a message indicative of key switch on event is generated by, for example, a sensor and is transmitted to the ECU 400. The ECU 400 retrieves various operating parameters from the first memory 403 and uses the updated parameters in various operating algorithms. The ECU 400 receives data from the sensors 130 positioned throughout the equipment 102 and outputs signals controlling various components of the engine based on the sensor data and the updated parameter configuration. The ECU 400 may control, for example, the amount of air and/or fuel sent to the engine cylinder(s) per engine cycle, ignition timing, variable valve timing, and operation of other engine components based on the sensor data and the updated ECU parameters.

Figure 5:
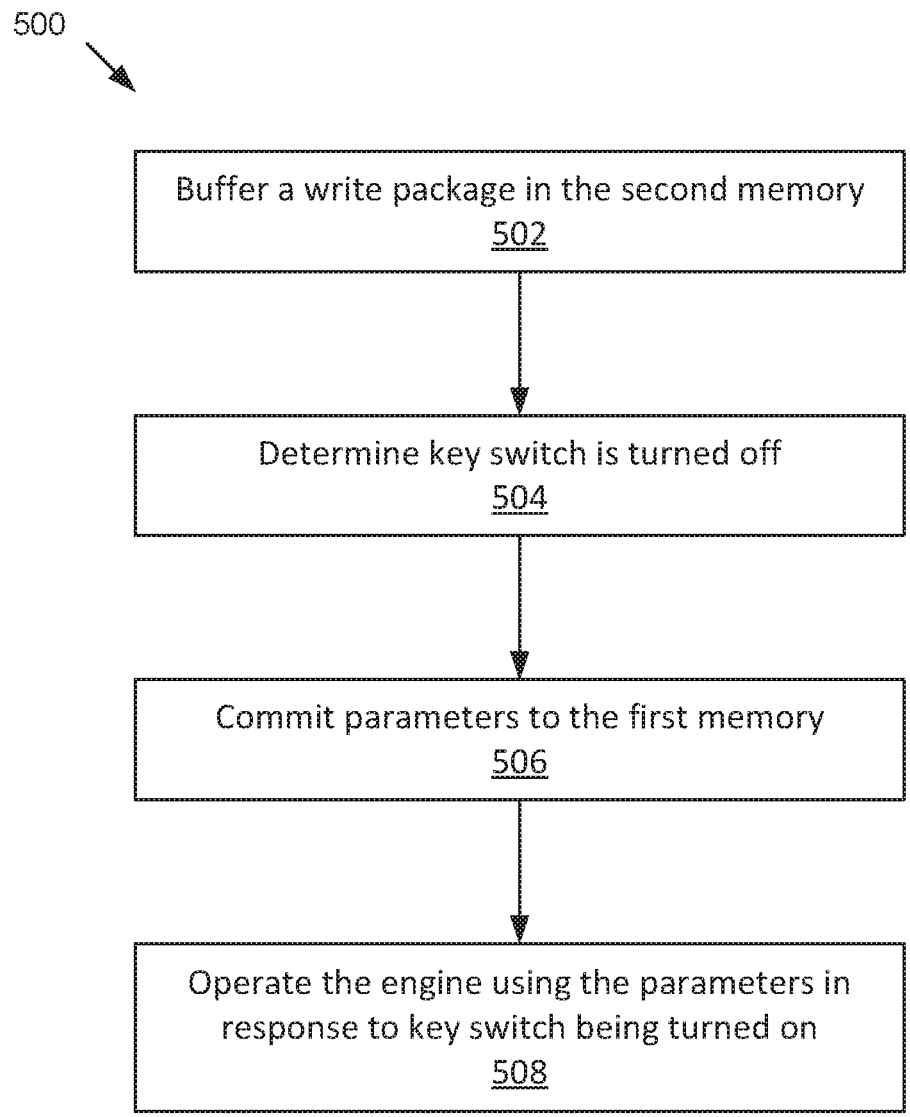
FIG. 5 is a flow diagram of a method for updating the configuration of the ECU of FIG. 4 according to an example embodiment.

Referring to FIG. 5, a flow diagram of a method 500 for updating the configuration of an ECU according to an example embodiment. The method may be executed by the ECU 110 (and the ECU 400).

At a process 502, a write package is buffered in a second memory of the ECU. The second memory may be a RAM buffer. The write package is received from the server through the telematics cloud. The write package may be received through a secured communication channel. In some embodiments, the write package includes a count of the parameters to be changed and a list of the parameters to be changed. If the count and the number do not match, the write package is discarded. In some embodiments, the write package includes an authentication password for accessing the ECU. If the authentication password does not match with a preset password stored in the memory of the ECU, the write package is discarded. In some embodiments, a flag is set in response to buffering the write package in the second memory to indicate that updated parameters are ready to be committed.

At a process 504, a key switch for an engine connected to the ECU is determined to be turned off. When the key switch is turned off, a message indicative of the key switch off event is generated by, for example, a sensor, and transmitted to the ECU, which then determines that the key switch is turned off.

At a process 506, the parameters to be changed are committed to a first memory of the ECU in response to determining that the key switch is turned off. The first memory may be a flash memory. In some embodiments, the count in the write package is compared again with the number of parameters in the list. If the count and the number do not match, the parameters are not committed in the first memory but are discarded. In some embodiments in which a flag was set when the write package is buffered in the second memory, the flag is cleared in response to committing the parameters in the first memory.

At a processor 508, the engine connected to the ECU is operated using the updated parameters stored in the first memory in response to the key switch being turned on. When the engine is turned on again, the ECU controls the operation of the engine according to the updated parameters stored in the first memory. In some embodiments, when updated engine parameters are ready to be deployed, a notification is displayed on an operator interface of the vehicle, asking the operator of the vehicle to approve the use of updated parameters. After the operator's approval, the ECU will enforce the updated parameters. Alternatively or additionally, the operator interface may display a notification informing the operator that parameters have been updated in the ECU.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the controller of FIG. 2 and the ECU of FIG. 4. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   a communication interface structured to transmit and receive data through a cloud connected application system;
   a controller communicably coupled to the communication interface, the controller structured to:
     determine at least one operation parameter to be changed of an engine control unit of an equipment based on a comparison between a current operation parameter of the equipment and a predefined threshold of the operation parameter, wherein the at least one operation parameter controls a component of an engine of the equipment;
     generate a write package including the at least one operation parameter to be changed, wherein the write package includes a count of each of the at least one operation parameter to be changed and a list of the at least one operation parameter to be changed; and
     cause the communication interface to transmit the write package to the equipment through the cloud connected application system, and wherein in response to a comparison indicating that the count matches the total amount of operation parameters in the list, at least one operation parameter is changed, and in response to a comparison indicating that the count does not match the total amount of operation parameters in the list, the write package is discarded.

2. The apparatus of claim 1, wherein the write package includes an authentication password for accessing the engine control unit of the equipment.

3. The apparatus of claim 1, wherein the controller is structured to receive the at least one operation parameter to be changed based on an input from a user.

4. The apparatus of claim 1, wherein the controller is further structured to:
   verify that the at least one operation parameter to be changed is applicable with the equipment.

5. The apparatus of claim 1, wherein the communication interface is structured to transmit the write package through a secured channel.

6. The apparatus of claim 1, wherein the controller is further structured to encrypt the write package.

7. The apparatus of claim 1, wherein the controller is further structured to sign the write package with a digital signature.

8. A method comprising:
   determining, by a computing system, at least one operation parameter to be changed of an engine control unit of an equipment based on a comparison between a current operation parameter of the equipment and a predefined threshold of the operation parameter, wherein the at least one operation parameter controls a component of an engine of the equipment;
   generating, by the computing system, a write package including the at least one operation parameter to be changed, wherein the write package further includes a count of each of the at least one operation parameter and a list of the at least one operation parameter to be changed; and
   transmitting, by the computing system, the write package to the equipment over the air through a cloud connected application system, and wherein in response to a comparison indicating that the count matches the total amount of operation parameters in the list, at least one operation parameter is changed, and in response to a comparison indicating that the count does not match the total amount of operation parameters in the list, the write package is discarded.

9. The method of claim 8, wherein the write package further includes an authentication password for accessing the engine control unit of the equipment.

10. The method of claim 8, further comprising verifying that the at least one operation parameter to be changed is applicable to the equipment.

11. An engine control unit, comprising:
    a first memory,
    a second memory, and
    a controller communicably connected to the first memory and the second memory, the controller structured to:
      buffer a write package in a second memory, wherein the write package is received through a cloud connected application system and includes at least one operation parameter to be changed of the engine control unit based on a comparison between a current operation parameter of the equipment and a predefined threshold of the operation parameter, wherein the at least one operation parameter controls a component of an engine of the equipment, wherein the write package includes a count of each of the at least one operation parameter to be changed and a list of the at least one operation parameter to be changed;
      compare the count to the number of operation parameters to be changed in the list;
      in response to the comparison indicating that the count matches the number of parameters to be changed in the list:
        determine that a key switch for the engine connected to the engine control unit is turned off;
        commit the at least one operation parameter to be changed to the first memory in response to determining that the key switch is turned off; and
        operate the engine using the at least one operation parameter committed in the first memory in response to the key switching being turned on; and
      in response to the comparison determining that the count and the total amount of operation parameters in the list do not match, discard the write package.

12. The engine control unit of claim 11, wherein the first memory stores a first authentication password, wherein the write package further includes a second authentication password for accessing the engine control unit, and the controller is further structured to:
    compare the first authentication password with the second authentication password, and
    discard the write package if the first authentication password and the second authentication password do not match.

13. The engine control unit of claim 11, wherein the controller is further structured to:
set a flag in response to buffering the write package in the second memory, and
clear the flag in response to committing the operation parameters to the first memory.

14. The engine control unit of claim 11, wherein the write package is received from a remote server through a secured communication channel.

15. The engine control unit of claim 11, wherein the write package is encrypted.

16. The engine control unit of claim 11, wherein the write package includes a digital signature.

17. A method comprising:
buffering a write package in a second memory, wherein the write package is received through a cloud connected application system and includes a list of at least one operation parameter to be changed of an engine control unit based on a comparison between a current operation parameter and a predefined threshold of the operation parameter, wherein the at least one operation parameter controls a component of an engine of the equipment, wherein the write package includes a count of each of the at least one operation parameter to be changed and a list of the at least one operation parameter to be changed;
comparing the count to the number of operation parameters to be changed in the list;
in response to the comparison indicating that the count matches the number of parameters to be changed in the list:
determining that a key switch for the engine connected to the engine control unit is turned off;
committing the at least one operation parameter to be changed to a first memory in response to determining that the key switch is turned off; and
operating the engine connected to the engine control unit using the at least one operation parameter committed in the first memory in response to the key switch being turned on; and
in response to the comparison determining that the count and the total amount of operation parameters in the list do not match, discarding the write package.

18. The method of claim 17, wherein the first memory stores a first authentication password, wherein the write package further includes a second authentication password for accessing the engine control unit, and the method further comprising:
comparing the first authentication password with the second authentication password, and
discarding the write package if the first authentication password and the second authentication password do not match.

19. The method of claim 17, further comprising:
setting a flag in response to buffering the write package in the second memory, and
clearing the flag in response to committing the at least one operation parameter to the first memory.

20. The method of claim 17, further comprising receiving the write package from a remote server through a secured communication channel.

21. The method of claim 17, wherein the write package is encrypted.

22. The method of claim 17, wherein the write package includes a digital signature.

* * * * *